(12) United States Patent
Liu et al.

(10) Patent No.: US 6,870,808 B1
(45) Date of Patent: Mar. 22, 2005

(54) CHANNEL ALLOCATION IN BROADBAND ORTHOGONAL FREQUENCY-DIVISION MULTIPLE-ACCESS/SPACE-DIVISION MULTIPLE-ACCESS NETWORKS

(75) Inventors: Hui Liu, Sammamish, WA (US); Hujun Yin, Seattle, WA (US); Xiaodong Li, Bellevue, WA (US); Fuqi Mu, Issaquah, WA (US)

(73) Assignee: Adaptix, Inc., Bothell, WA (US)

( * ) Notice: Subject to any disclaimer, the term of this patent is extended or adjusted under 35 U.S.C. 154(b) by 793 days.

(21) Appl. No.: 09/692,681

(22) Filed: Oct. 18, 2000

(51) Int. Cl.⁷ .......................... H04J 11/00; H04B 7/208
(52) U.S. Cl. .................... 370/203; 370/210; 370/329; 370/344
(58) Field of Search ................................ 370/203, 206, 370/208, 210, 252, 319, 328, 329, 343, 344, 480, 485, 330; 375/260, 261, 267, 299, 347; 455/450, 507, 509, 517

(56) References Cited

U.S. PATENT DOCUMENTS

| | | | |
|---|---|---|---|
| 5,280,630 A | 1/1994 | Wang | |
| 5,479,447 A | 12/1995 | Chow et al. | |
| 5,504,775 A | 4/1996 | Chouly et al. | |

(List continued on next page.)

FOREIGN PATENT DOCUMENTS

| | | |
|---|---|---|
| DE | 198 00 953 C1 | 7/1999 |
| EP | 0 869 647 A2 | 10/1998 |
| EP | 0 926 912 A2 | 6/1999 |
| EP | 0 999 658 A2 | 5/2000 |
| GB | 2 209 858 A | 8/1997 |
| JP | 06029922 | 2/1994 |
| WO | WO 98/16077 A2 | 4/1998 |
| WO | WO 98/30047 A1 | 7/1998 |

OTHER PUBLICATIONS

Farsakh, C. et al., "Maximizing the SDMA Mobile Radio Capacity Increase by DOA Sensitive Channel Allocation", Wireless Personal Communications, Kluwer Academic Publishers, NL, vol. 11, No. 1, Oct. 1999, pp. 63–76, XP000835062, ISSN: 0929–6212.

Wong, C.Y., et al., *Multiuser OFDM With Adaptive Subcarrier, Bit, and Power Allocation,* IEEE Journal on Selected Areas in Communications, Oct. 1999, IEEE Inc., New York, USA, vol. 17, Nr. 10, pp. 1747–1758, XP000854075, ISSN: 0733–8716 Sections I and II abstract.

(List continued on next page.)

*Primary Examiner*—Alpus H. Hsu
(74) *Attorney, Agent, or Firm*—Blakely, Sokoloff, Taylor & Zafman LLP (57) ABSTRACT

A network is described. In one embodiment, the network comprises multiple subscriber units to communicate with the base station using an orthogonal frequency-division multiple-access (OFDMA) protocol, and a base station. The base-station includes a memory unit to store broadband spatial signature vectors associated with each subscriber and traffic channel allocation logic. The vectors are a function of frequency. The traffic channel allocation logic allocates OFDMA channels using the broadband spatial signature vectors of the subscribers.

42 Claims, 6 Drawing Sheets

U.S. PATENT DOCUMENTS

| | | | |
|---|---|---|---|
| 5,507,034 A | | 4/1996 | Bodin et al. |
| 5,515,378 A | | 5/1996 | Roy, III et al. |
| 5,555,268 A | | 9/1996 | Fattouche et al. |
| 5,588,020 A | | 12/1996 | Schilling |
| 5,708,973 A | | 1/1998 | Ritter |
| 5,726,978 A | | 3/1998 | Frodigh et al. |
| 5,734,967 A | | 3/1998 | Kotzin et al. |
| 5,774,808 A | | 6/1998 | Sarkioja et al. |
| 5,822,372 A | | 10/1998 | Emami |
| 5,867,478 A | | 2/1999 | Baum et al. |
| 5,886,988 A | * | 3/1999 | Yun et al. .................. 370/329 |
| 5,887,245 A | | 3/1999 | Lindroth et al. |
| 5,909,436 A | | 6/1999 | Engstrom et al. |
| 5,914,933 A | | 6/1999 | Cimini et al. |
| 5,933,421 A | * | 8/1999 | Alamouti et al. .......... 370/330 |
| 5,956,642 A | | 9/1999 | Larsson et al. |
| 5,973,642 A | | 10/1999 | Li et al. |
| 6,005,876 A | | 12/1999 | Cimini, Jr. et al. |
| 6,009,553 A | | 12/1999 | Martinez et al. |
| 6,026,123 A | | 2/2000 | Williams |
| 6,041,237 A | | 3/2000 | Farsakh |
| 6,052,594 A | | 4/2000 | Chuang et al. |
| 6,061,568 A | | 5/2000 | Dent |
| 6,064,692 A | | 5/2000 | Chow |
| 6,064,694 A | | 5/2000 | Clark et al. |
| 6,067,290 A | | 5/2000 | Paulraj et al. |
| 6,108,374 A | | 8/2000 | Balachandran et al. |
| 6,111,919 A | | 8/2000 | Yonge, III |
| 6,131,016 A | | 10/2000 | Greenstein et al. |
| 6,141,565 A | | 10/2000 | Feuerstein et al. |
| 6,226,320 B1 | | 5/2001 | Hakkinen et al. |
| 6,282,185 B1 | | 8/2001 | Hakkinen et al. |
| 6,298,092 B1 | | 10/2001 | Heath, Jr. |
| 6,307,851 B1 | | 10/2001 | Jung et al. |
| 6,327,472 B1 | | 12/2001 | Westroos et al. |
| 6,330,460 B1 | | 12/2001 | Wong et al. |
| 6,366,195 B1 | | 4/2002 | Harel et al. |
| 6,377,632 B1 | | 4/2002 | Paulraj et al. |
| 6,377,636 B1 | | 4/2002 | Paulraj et al. |
| 6,449,246 B1 | * | 9/2002 | Barton et al. ............... 370/210 |
| 6,473,467 B1 | * | 10/2002 | Wallace et al. ............. 375/267 |
| 6,477,158 B1 | | 11/2002 | Take |
| 6,545,997 B1 | | 4/2003 | Bohnke et al. |
| 6,657,949 B1 | | 12/2003 | Jones, IV et al. |
| 2003/0067890 A1 | | 4/2003 | Goel et al. |
| 2003/0169681 A1 | | 9/2003 | Li et al. |
| 2003/0169824 A1 | | 9/2003 | Chayat |

OTHER PUBLICATIONS

Bender et al., CDMA/HDR: A Bandwidth–Efficient High Speed Wireless Data Service for Nomadic Users, IEEE Communications Magazine, Jul. 2000, pp. 70–87.

Frullone et al., PRMA Performance in Cellular Environments with Self–Adaptive Channel Allocation Strategies, IEEE Transactions on Vehicular Technology, Nov. 1996, pp. 657–665 vol. 45, No. 4.

Xu, Guanghan and Li, San–Qi, Throughput Multiplication of Wireless Lans for Multimedia Services: SDMA Protocol Design, 1994 IEEE, pp. 1326–1332.

Ward, James and Compton, R. Ted, Jr., High Throughput Slotted ALOHA Packet Radio Networks with Adaptive Arrays, IEEE Transactions on Communications, Mar. 1993, pp. 460–470, vol. 41, No. 3.

Tsoulos, G.V., Smart antennas for mobile communication systems: benefits and challenges, Electronics & Communication Engineering Journal, Apr. 1999, pp. 84–94.

Shad et al., Indoor SDMA Capacity Using a Smart Antenna Basestation, 1997 IEEE, pp. 868–872.

Farsakh, Christof and Nossek, Josef A., On the Mobile Radio Capacity Increase Through SDMA, no date (after 1997).

Mignone et al., CD3–OFDM: A Novel Demodulation Scheme for Fixed and Mobile Receivers, IEEE Transactions on Communications, vol. 44, No. 9, Sep. 1996.

* cited by examiner

CHANNEL ALLOCATION IN BROADBAND ORTHOGONAL FREQUENCY-DIVISION MULTIPLE-ACCESS/SPACE-DIVISION MULTIPLE-ACCESS NETWORKS

FIELD OF THE INVENTION

The present invention relates to the field of communications systems; more particularly, the present invention relates to orthogonal frequency-division multiple-access (OFDMA) networks that employ space-division multiple-access.

BACKGROUND OF THE INVENTION

For broadband wireless networks that support mixed traffic, it is required that a medium access control (MAC) be able to effectively adapt to changing channel conditions and traffic requirements. One of the key resources in wireless communication is the spatial diversity provided by antenna arrays. Efficient exploitation of spatial diversity is fundamentally important to resource critical wireless applications. See Tsoulos, "Smart Antennas For Mobile Communication Systems: Benefits and Challenges," Electronics and Communication Engineering Journal, Vol. 11(2), April 1999.

One of the most aggressive ways of exploiting the spatial diversity is space-division multiple-access (SDMA), or spatial multiplexing, that attempts to multiply the throughput of a wireless network by introducing "spatial channels". The benefits of SDMA in narrowband applications have been investigated by Shad et al., "Indoor SDMA Capacity Using a Smart Antenna Base Station," IEEE Proc. ICUPC'97, pp. 868—872, 1997; Farsakh et al., "On the Mobile Radio Capacity Increase Through SDMA," Accessing, Transmission, Networking Proceedings, pp. 293–297, 1998; Xu et al., "Throughput Multiplication of Wireless LANs for Multimedia Services: SDMA Protocol Design," Proc. Globecom'94, San Francisco, Calif., November 1994; Ward et al., "High Throughput Slotted ALOHA Packet Radio Networks with Adaptive Arrays," IEEE Trans. COM, Vol. 41(3), pp. 460–470, March 1993. The narrowband SDMA scheme is particularly suitable for fixed wireless networks where the spatial characteristics are relatively stable. For a system with M antenna elements, the underlying idea is to allow M subscribers to share a time-division multiple-access (TDMA) slot through M spatial channels/slots, so that the total number of non-interfering traffic channels can be increased by M fold.

Though intuitively promising, an obvious flaw of this scheme is that spatial channels are rarely orthogonal in practice. In other words, traffic over SDMA channels are mutually interfering. If multiple subscribers are assigned to one time slot without considering these spatial characteristics, the one with an unfavorable spatial configuration may experience significant throughput disadvantages. Since the effectiveness of spatial separation depends on the base-station array responses (often referred to as the spatial signatures) of all co-slot subscribers and the spatial processing technique employed, the instantaneous signal-to-noise-plus-interference ratio (SINR) of spatially multiplexed outputs can vary dramatically. This problem is investigated by Ward et al., "High Throughput Slotted ALOHA Packet Radio Networks with Adaptive Arrays," IEEE Trans. COM, Vol. 41(3), pp 460–470, March 1993, where collision due to un-resolvable packets (when the arrival angles of multiple packets are within a threshold) is accounted for. Although the analysis is somewhat simplified, the study reveals some of the key limitations of basic SDMA scheme.

A fundamental solution to the above problem is the "channel-aware" MAC protocol that assigns traffic channels based on the spatial characteristics of the subscribers. Using such a protocol, the performance of SDMA system can be enhanced with spatial signature-based scheduling (e.g., assigning the "less-interfering" subscribers to the same time slot to increase the traffic throughput). The MAC treatment allows a system to exploit the spatial diversity in an efficient manner using spatial processing with fixed-complexity. Several scheduling algorithms are proposed and studied for "narrow band" systems where the spatial characteristics can be described by a one-dimensional vector; see Shad et al., "Indoor SDMA Capacity Using a Smart Antenna Base Station," IEEE Proc. ICUPC'97, pp. 868–872, 1997; Farsakh et al., "On the Mobile Radio Capacity Increase through SDMA," Accessing, Transmission, Networking Proceedings, pp. 293–297, 1998; and U.S. Pat. No. 6,041,237, "Method of Channel Allocation," issued Mar. 21, 2000.

All of the existing channel allocation schemes, however, consider "narrowband" TDMA wireless network in conjunction with SDMA. None of them is applicable to broadband wireless networks. The prime reason is that in broadband application, subscribers' spatial channels are two-dimensional, in both space and frequency, and channel assignment under spatial multiplexing becomes a more involved problem.

Recently, there is an increasing interest in frequency division multiple access (OFDMA) based broadband wireless networks. OFDMA can be viewed from one perspective as attempting to achieve system capacity over multiple-subscriber broadband wireless channels.

SUMMARY OF THE INVENTION

A network is described. In one embodiment, the network comprises multiple subscriber units to communicate with the base station using an orthogonal frequency-division multiple-access (OFDMA) protocol, and a base station. The base-station includes a memory unit to store broadband spatial signature vectors associated with each subscriber and traffic channel allocation logic. The vectors are a function of frequency. The traffic channel allocation logic allocates OFDMA channels using the broadband spatial signature vectors of the subscribers.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A network described herein combines orthogonal frequency-division multiple-access (OFDMA) with space-division multiple-access (SDMA) to provide an OFDMA/SDMA protocol that offers an increase in capacity, while assigning OFDMA/SDMA traffic channels to multiple-access subscribers based on their broadband (two-dimensional) channel characteristics. In one embodiment, such a network is a cellular network implementing OFDMA in conjunction with spatial multiplexing in a broadband wireless cellular network. The cellular network includes a base-station with spatially separated transceivers and multiple subscribers communicating with the base-station using an OFDMA protocol. The term "subscriber" or "subscribers" is used herein to refer to a subscriber unit or device.

The network includes traffic channel allocation logic that increases, and potentially maximizes, the network throughput based on the broadband propagation characteristics between the base-station and the subscribers. In one embodiment, each traffic channel is a cluster of OFDM sub-carriers that may be shared by multiple subscribers through spatial multiplexing. When a new link between the base-station and a subscriber is to be established, the traffic channel allocation logic first estimates two-dimensional (space and frequency/time) broadband propagation channels between the base-station and the new subscriber. Frequency and time are the same time represented in two different domains. The traffic channel allocation logic then accommodates a rate request received from the new subscriber by assigning traffic channels that utilizes a predetermined (e.g., the minimum) amount of transmission power (in comparison to the amount of transmission power necessary to transmit over one or more other OFDMA traffic channels that were not assigned to the new subscriber) and causes a certain amount of interference (e.g., the least interference in comparison to the interference to other subscribers caused by the new subscriber using one or more of the OFDMA traffic channels that were not assigned to the new subscriber) to co-channel subscribers. The rate request is received from the subscriber either prior to the process of establishing the new link or concurrently therewith.

In alternative embodiments, the traffic channel allocator logic assigns traffic channels that require use of an amount of transmission power greater than the minimum and/or cause an amount of interference greater than those channels that cause the least interference (if used for the new subscriber's traffic). Such assignments may, for example, be used on other channel allocation or loading requests by made at the same time or scheduled to occur in the future.

In the following description, numerous details are set forth in order to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Efficient exploitation of spatial diversity in high-speed wireless network is a challenging task due to the broadband nature of spatial channel characteristics. In OFDMA networks, the wide spectrum is partitioned into parallel narrowband traffic channels. The methodology described herein increases, and potentially maximizes, the capacity of a broadband OFDMA/SDMA network through intelligent traffic channel assignment.

Figure 1:
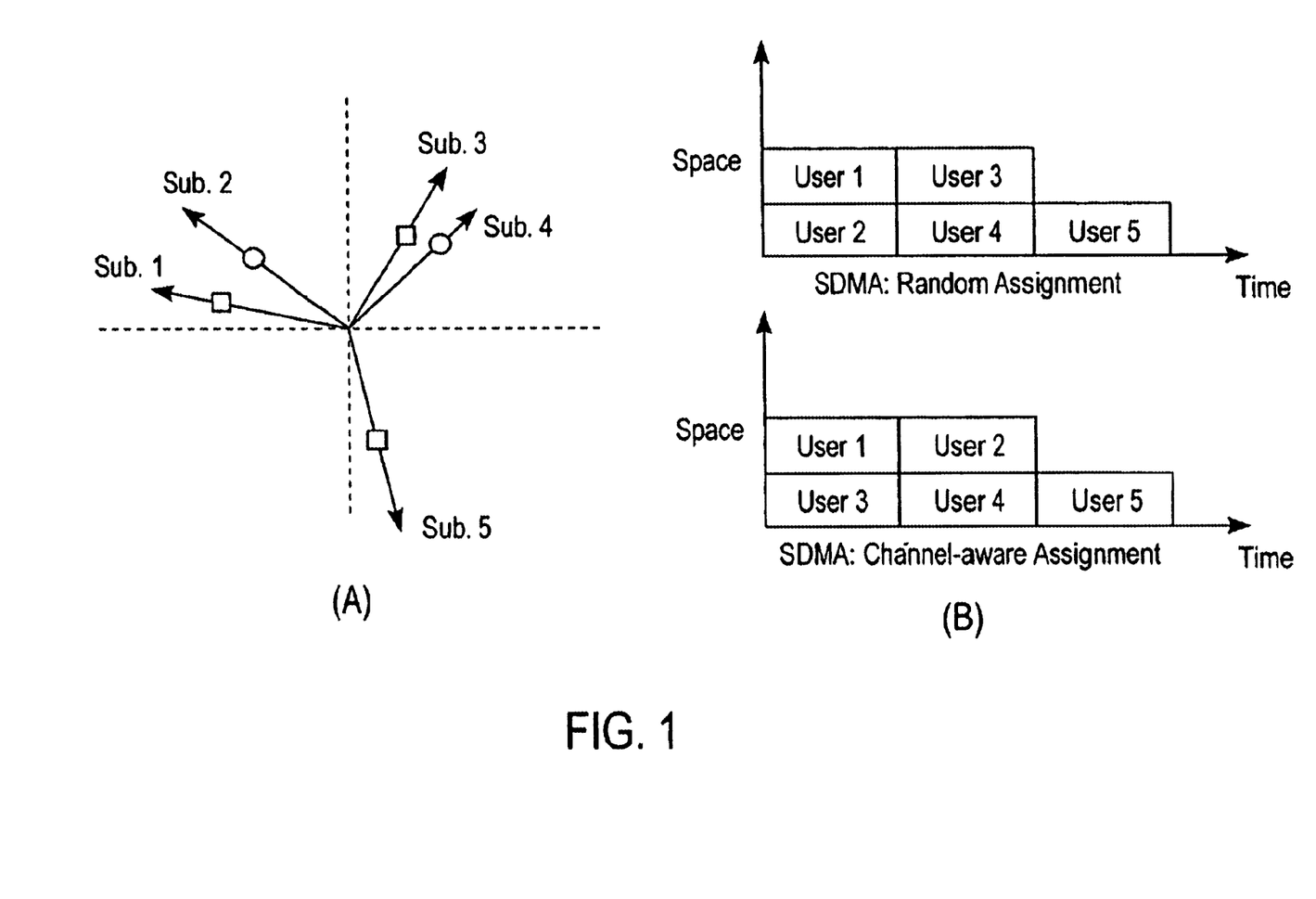
FIG. 1A illustrates multiple subscribers.
FIG. 1B illustrates randomly assigning subscribers to channels and the idea of "spatial signature-aware" channel assignment, where less interfering subscribers are assigned to the same traffic slot to increase system capacity.

The concept of channel assignment for narrowband SDMA networks is illustrated in FIG. 1. In such application, each spatial channel can be described by a vector, referred to herein as a narrowband "spatial signature." For a system with M antenna elements, the spatial signature can be represented as $A\_i\, a\_i$, where $A\_i$ is a fading coefficient of the channel and $a\_i=[a\_1i, a_{13} 2i, \ldots, a\_Mi]$ is an Mx1 vector that characterizes the relative complex gains between antennas. The level of interference between co-channel subscribers (sharing the same spectral resource, e.g., the same time slot/the same frequency/the same code (e.g., the spreading code) is determined by the degree of orthogonality between their corresponding spatial signatures. (See Farsakh et al., "On the Mobile Radio Capacity Increase Through SDMA", Accessing, Transmission, Networking Proceedings, pp. 293–297, 1998.) Referring to the example in FIG. 1A, the spatial signatures of subscribers 1, 3, and 5 are almost orthogonal, so are those of subscribers 2 and 4. On the other hand, the spatial signatures of subscribers 1 and 2 are near aligned, indicating strong mutual interference should they be assigned to the same traffic channel.

Conventional SDMA simply assigns subscribers to their traffic channels (time slots in this case) in a pre-determined order. For example, in top of FIG. 1B, subscriber 1 and 2 are allocated to the same time slots, while being separated in space. Similarly, subscribers 3 and 4 are allocated to the same time slot while being separated in space. The possibility of strong interference between co-channel subscribers (in this particular example: slot 1, between subscribers 1 and 2; slot 2, between subscribers 3 and 4) is high. To reduce the interference level and improve the system capacity, traffic channels are assigned in a way that the most (if not all) interfering subscribers are allocated to different time slots (as in bottom of FIG. 1B). By lifting the worst case performance, significant capacity gains can be achieved using this strategy without undue complexity in spatial processing.

Figure 2:
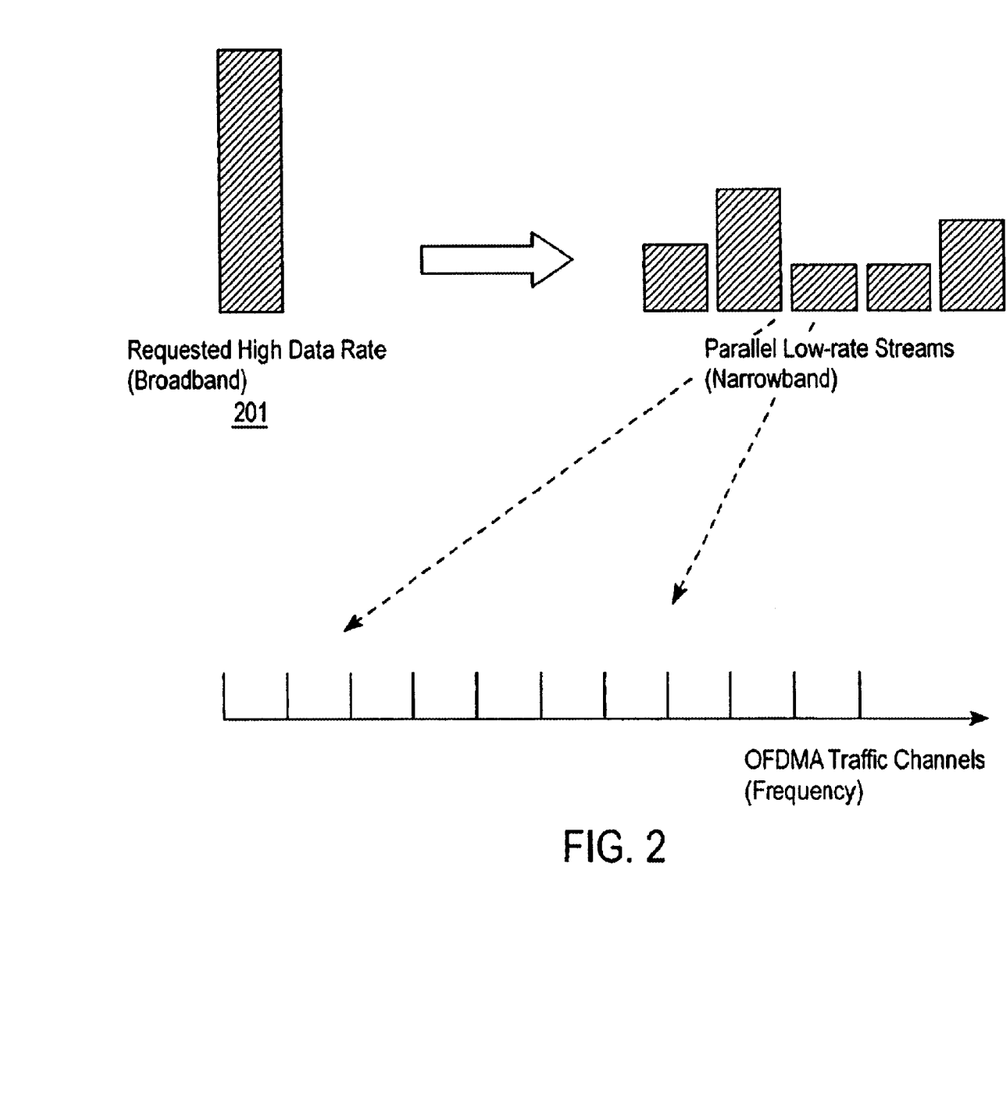
FIG. 2 shows accommodating a high data rate with parallel narrowband data streams transmitted over OFDMA traffic channels.

The channel assignment problem becomes much more involved in broadband applications (e.g., broadband antenna array systems, etc.) where the spatial signature is no longer a vector. In the case of the OFDMA-based network described herein, high data rate traffic is accommodated with multiple low-rate (narrowband) data streams over orthogonal narrowband traffic channels. These narrowband traffic channels, centered at different frequencies, provide a parallel structure for higher flexibility and ease of implementation. FIG. 2 illustrates such a structure in which high data rate traffic 201 is provided in the form of parallel data streams over orthogonal narrowband traffic channels centered at different frequencies. As a result, the "broadband spatial signature" associated with each subscriber becomes a two-dimensional matrix, or a set of narrowband spatial signature vectors that are a function of the frequency. In one embodiment, the spatial signature of subscriber i in OFDMA is given by

[$A\_i1\, a\_i1, A\_i2, \ldots, A\_iK\, a\_iK$], where $A\_ik$ is the fading coefficient of traffic channel k, $a\_ik$ is the Mx1 spatial signature vector of traffic channel k, and K is the total number of OFDMA traffic channels (in frequency). When K=1, the above reduces to a narrowband setup. In contrast to the narrowband case where the spatial signature is "invariant" to the channel assignment, a broadband subscriber experiences different fading and spatial characteristics in different traffic channels.

Figure 3:
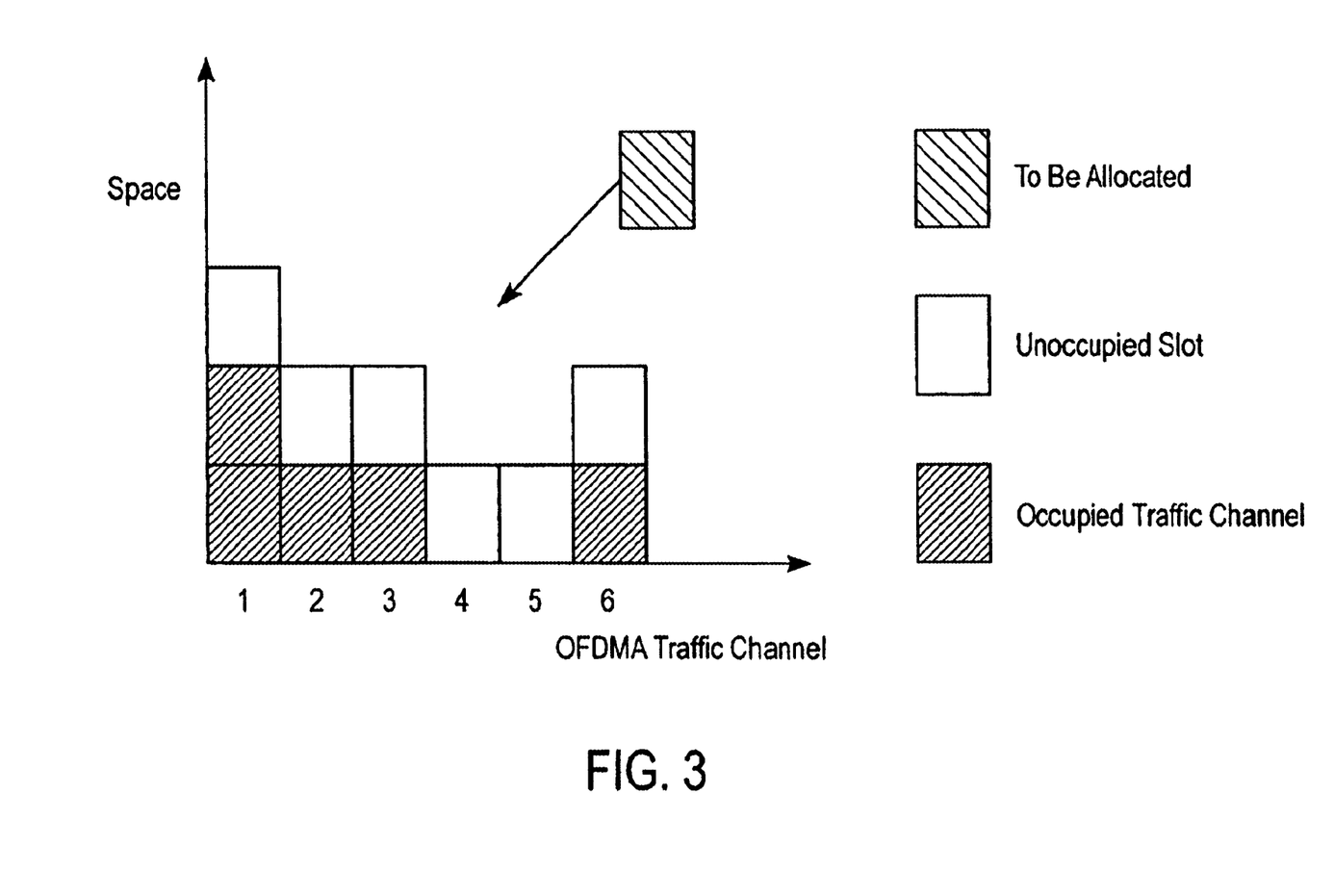
FIG. 3 illustrates channel assignment in OFDMA/SDMA in the presence of on-going traffics.

A goal of broadband traffic channel assignment in OFDMA described herein is to allocate traffic channels to new subscribers (in the presence of on-going traffics) in a way that increases, and potentially maximizes, the system capacity. The process may be illustrated using FIG. 3. Referring to FIG. 3, on-going traffic identified by solid blocks occupy certain numbers of OFDMA traffic channels (e.g., channels 1, 2, 3, and 6), some of which, e.g., traffic channel 1, are shared by more than one subscribers using spatial multiplexing. The unshaded blocks represent OFDMA channels that are unoccupied (i.e., not being used). The shaded block represents traffic that is to be allocated or assigned to one or more OFDMA channels.

In one embodiment, several factors may be considered in determining which set of traffic channels are to be assigned to a new subscriber: (a) the channel fading conditions of the new subscriber at all traffic channels, (b) the spatial signature vectors of the new subscriber across all traffic channels, (c) the spatial signature vectors of on-going traffic, and (d) the data rate of on-going traffic of subscribers that have already been in communication with the base-station.

In the communication system described herein, channel allocation logic performs "channel-aware" traffic channel allocation. In one embodiment, the channel allocation logic provides bandwidth on demand and efficient use of spectral resources (e.g., OFDMA traffic channels) and spatial resources (e.g., the physical location of subscribers as it pertains to spatial beamforming) and performs traffic channel assignment based on broadband spatial channel characteristics of a requesting subscriber and on-going subscribers. Thus, the channel allocation may reduce resource usage (e.g., reduce usage of OFDMA channels).

In responding to a link request from a new subscriber, or when the base-station has data to transmit to a standby subscriber, the logic first estimates the spatial signature of the corresponding subscriber over all, or a predetermined portion of OFDMA traffic channels. In one embodiment, the estimated information, along with the spatial characteristics of on-going subscribers are used to determine the achievable rate of the accessing subscriber over each of the OFDMA channels (with the presence of on-going SDMA subscribers). In an alternative embodiment, the estimated information and the spatial characteristics associated with on-going traffic channels are used to determine the SINR of the accessing subscriber over each of the OFDMA channels. The spatial characteristics may be stored in a register or other type of storage location (e.g., a spatial signature register). In one embodiment, traffic channels that have the highest achievable rates and will not affect the rates of on-going traffic are assigned to the accessing subscriber to satisfy the rate request of the accessing subscriber.

In an alternative embodiment, traffic channels without the highest achievable rates may be allocated to a new subscriber, while leaving the traffic channels with the highest achievable rates to be allocated in the future. Similarly, traffic channels that affect the rates of subscribers due to some level of interference with on-going traffic may be allocated in certain instances. For example, in one embodiment, such allocations may occur because the achievable rate is so high that the degradation of on-going traffic is tolerable.

A base-station architecture that communicates with multiple subscribers in an OFDMA/SDMA fashion is also disclosed. In one embodiment, the base-station includes multiple receiving antennas, each of which is connected to a down-converter, an OFDM demodulator, a 2-D spatial signature estimator, an on-going traffic register and an on-going traffic spatial signature register, an OFDMA/ SDMA traffic channel allocation logic, an OFDMA medium access controller, an OFDM modem, an OFDM broadband beamformer, multiple up-converters, and multiple transmission antennas, each connected to one of the upconverters.

Figure 5:
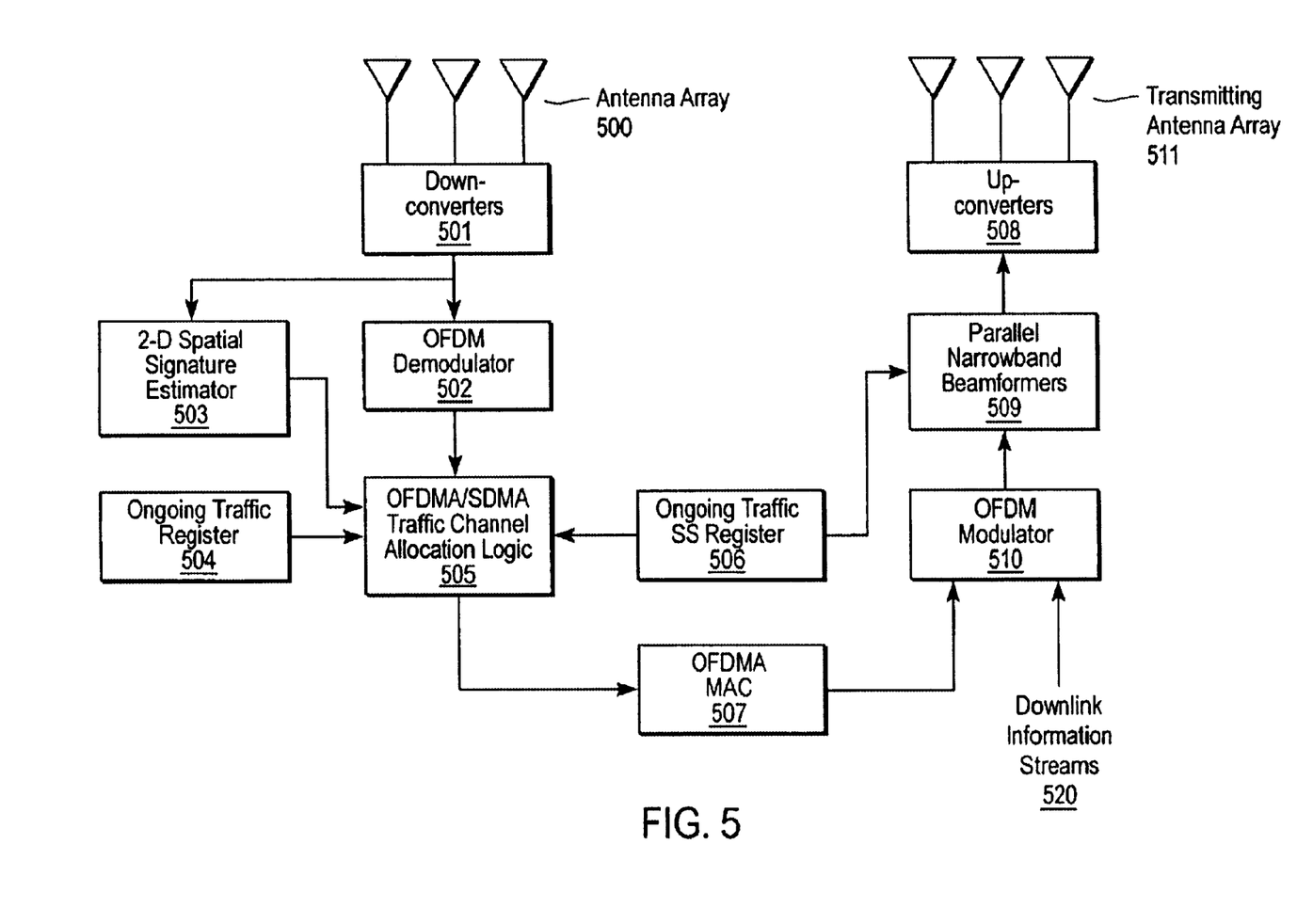
FIG. 5 is a block diagram of one embodiment of an OFDMA/SDMA base-station.

FIG. 5 is a block diagram of an antenna array base-station that communicates with multiple subscribers through OFDMA and spatial multiplexing. Referring to FIG. 5, the base-station 500 comprises receiving antenna array 500, a set of down-converters 501 coupled to receiving antenna array 300, an OFDM demodulator 502, a broadband (2-D) spatial signature estimator 503, an on-going traffic register 504, an OFDMA/SDMA traffic channel allocation logic 505, an on-going traffic spatial signature register 506, an OFDMA medium access controller (MAC) 507, an OFDM modem 510, a set of parallel narrowband beamformers 509, a set of up-converters 508 and a transmission antenna array 511.

Uplink signals, including the accessing signal from a requesting subscriber, are received by receiving antenna array 500 and down-converted to the base-band by down-converters 501. The base-band signal is demodulated by OFDM demodulator 502 and also processed by the 2-D spatial signature estimator 503 for estimation of the accessing subscriber's broadband spatial signature using, e.g., an FFT based spatial signature estimator or other well-known parametric spatial channel estimation algorithms. The estimated 2-D spatial signature, along with spatial signature of subscribers corresponding to on-going traffic stored in the on-going traffic spatial signature register 506 and on-going traffic information stored in the on-going traffic register 504, are fed to OFDMA/SDMA traffic channel allocation logic 505 to determine a traffic channel assignment for the accessing subscriber, and possibly partial or all of the on-going subscribers. The results are sent to OFDMA MAC 507 that controls the overall traffic.

Control signals from OFDMA MAC 507 and downlink data streams 520 are mixed and modulated by OFDM modulator 510 for downlink transmission. Spatial beamforming can be applied with a set of parallel narrowband beamformers 509 using spatial information stored in the on-going traffic spatial signature register 506. Specifically, the beamforming coefficients used by beamformers-509 are calculated based on each subscriber's spatial signature. The output of beamformers 509 are up-converted by the set of up-converters 508, and transmitted through transmission antenna array 511.

Figure 4:
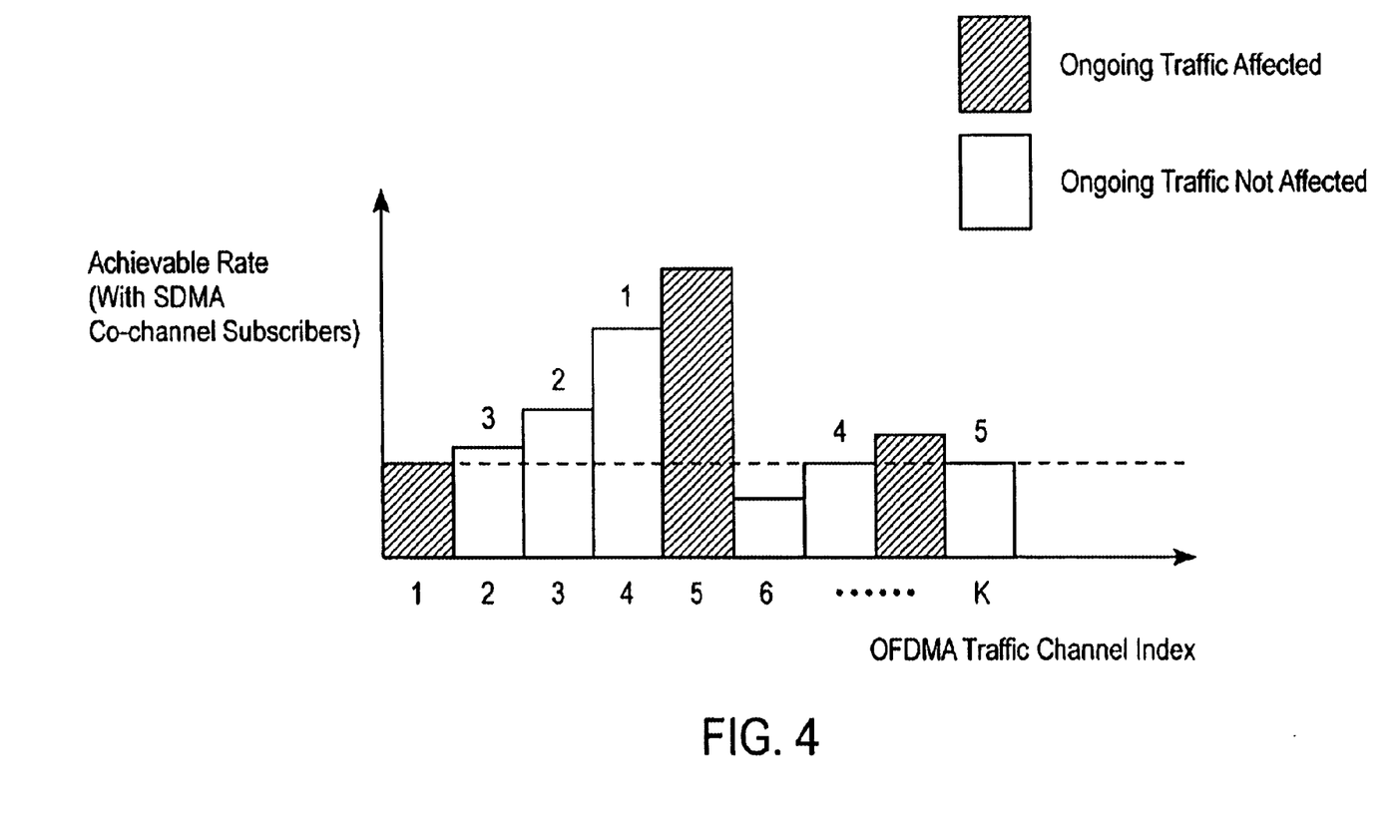
FIG. 4 shows the achievable rates of accessing subscribers in each of the OFDMA traffic channels in the presence of on-going subscribers.

In order to find one traffic channel assignment for the requesting subscriber, the traffic channel allocation logic first ranks all traffic channels in the order of the so-called achievable rate for the subscriber. In one embodiment, the achievable rate of the requesting subscriber over a particular traffic channel is limited by the noise power, its channel fading coefficient, and the spatial signatures of all co-channels subscribers in this channel. Other factors include the actual signal processing/communication techniques employed to separate the co-channel subscribers. Once the signal processing/communication techniques (e.g., technology for multi-user beam forming to separate multiple users) are selected, the base-station calculates the achievable data rate for the accessing subscriber and ongoing subscriber (s) over each of the traffic channels as shown in FIG. 4. Referring to FIG. 4, traffic channels in which on-going traffic are affected with the addition of accessing subscriber are shaded. In one embodiment, for the accessing subscriber, its most favorable traffic channels are those corresponding to the highest rates, e.g., traffic channels 5, 4, 3, . . . However, adding a new subscriber to a traffic channel with on-going subscribers may affect the traffic rates of on-going subscribers. Accordingly, in one embodiment, only traffic channels in which on-going traffic rates will not be affected by the addition of the new subscribers are reused. Alternatively, traffic channels in which on-going traffic is affected by a predetermined small amount (e.g., a tolerable amount for the application) may be allocated. Other traffic channels are shaded and marked "unusable" (in this case, traffic channels 1, 5, K-1) to the new subscriber.

Figure 6:
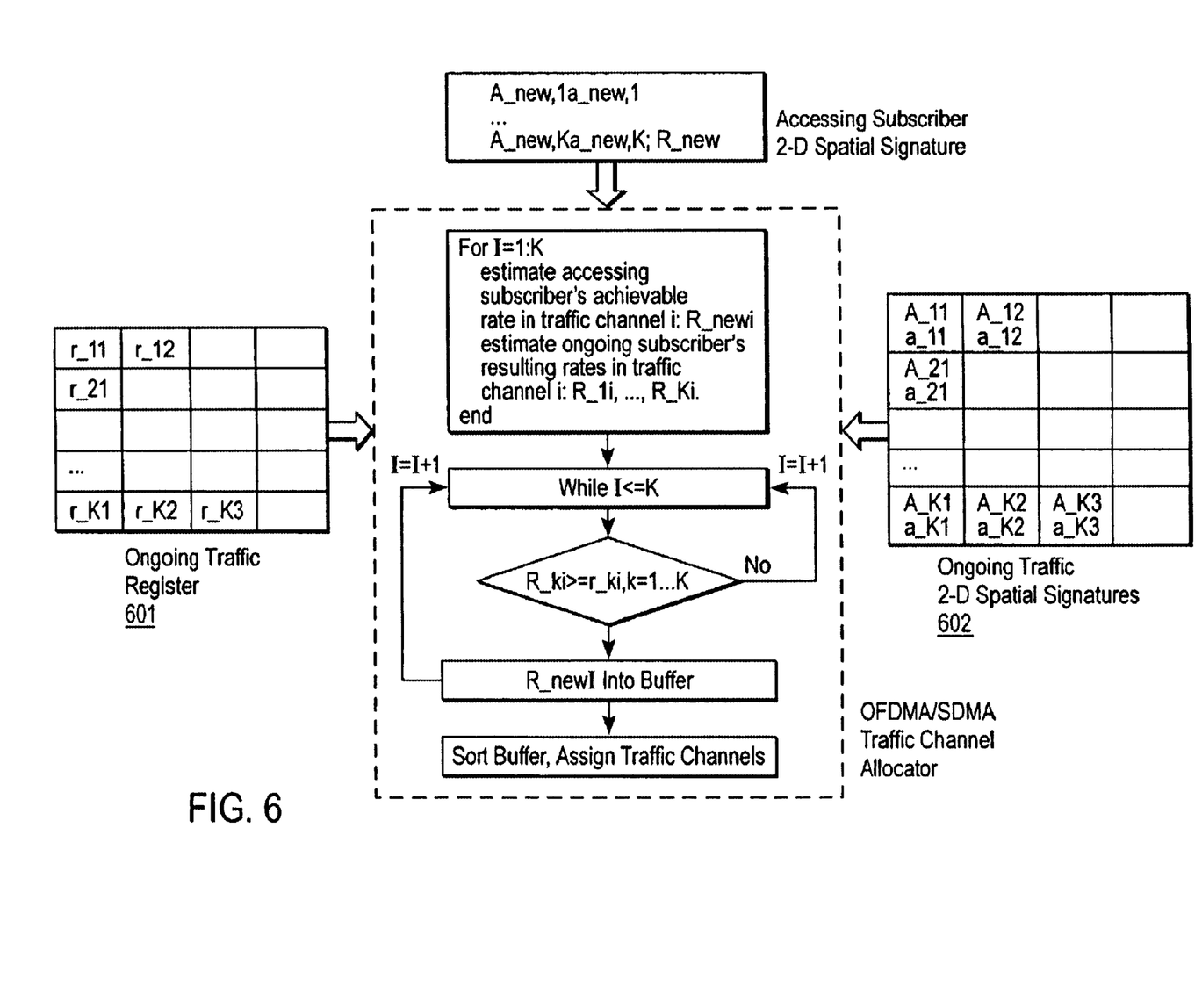
FIG. 6 is a decision making flow of one embodiment of the OFDMA/SDMA traffic channel allocation logic.

FIG. 6 illustrates operations performed by one embodiment of the traffic channel allocation logic. Referring to FIG. 6, inputs to the channel allocation logic include the 2-D spatial signature of the accessing subscriber, A_new,1 a_new,1, . . . , A_new,K a_new,K; the requested data rate, R_new from storage (not shown); the data rates of on-going traffic in each of the traffic channels from on-going traffic storage 601; and the 2-D spatial signatures of on-going subscribers from storage 602.

In one embodiment, the logic starts a loop from traffic channel 1 to traffic channel K and calculates the achievable rate for the accessing subscriber over each of the traffic channels. The results, R new,1, . . . , R_new,K, are saved for further evaluation. In another embodiment, the logic calculates the SINRs in a manner well-known in the art for the requesting subscriber over each of the traffic channels.

In calculating the achievable rate or the SINR value, different spatial processing algorithms, e.g., single-user detection and multi-user detection, may be used. The achievable rate or the SINR value depends on the actual spatial processing algorithm used in practice.

Also calculated are the achievable rates of on-going subscribers at each of the traffic channels with on-going traffic for the case that the requesting subscriber is added to that traffic channel: R_i,k, k=1, . . . , K. Similarly, in an alternative embodiment, the logic can calculate the SINR values of on-going subscriber at each of the traffic channels, for that case that the requesting subscriber is added to that traffic channel.

The logic then examines whether these updated achievable rates (or SINRs) are lower than the actual rates (or SINR) requirements of subscribers with on-going traffic (e.g., a minimum data rate requirement that must be satisfied). Note the actual rate may be higher when extra resources are available of subscribers with on-going traffic. Traffic channels in which the requesting subscriber is added and, therefore, in which the new rates or SINRs drop below the on-going rates or SINR thresholds are labeled "unusable" for the requesting subscriber. The remaining traffic channels are ranked and assigned in a descending order of the achievable rates or SINR values for the requesting subscribers. The thresholds may be set to ensure a specific signal quality at a particular data rate.

The process stops when the total rates for the requesting subscriber exceed a pre-determined value for the requesting subscriber.

Other criteria, e.g., the mean-squared errors of the spatial multiplexing outputs, the packet error rate in the case of packet data, etc., can be used for channel allocations in place of, or in addition to, the achievable rate.

Other Quality of Service (QoS) requirements of the new subscriber or other subscribers with on-going traffic, e.g., the packet delay, the throughput, and bit-error-rate, can be used in place of, or together with, the achievable rate or the SINR value in channel allocation.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A network comprising:

a base station; and a plurality of subscriber units to communicate with the base station using an orthogonal frequency-division multiple-access (OFDMA) protocol;

the base station including a memory to store broadband spatial signature vectors associated with each subscriber, the vectors being a function of frequency; and traffic channel allocation logic to allocate OFDMA channels using the broadband spatial signature vectors of the subscribers.

2. The network defined in claim 1 wherein the broadband spatial signature vectors are indicative of fading and spatial characteristics of the subscribers.

3. The network defined in claim 1 wherein at least one of the spatial signature vectors is indicative of channel fading conditions of a new subscriber at all OFDMA traffic channels.

4. The network defined in claim 1 further comprising data rate storage for storing information indicative of the data rate of on-going traffic.

5. The network defined in claim 1 wherein the traffic channel allocation logic allocates the OFDMA channels, in response to 2-D spatial signatures of an accessing subscriber and one or more subscribers with on-going traffic and data rates of on-going traffic, by selecting OFDMA channels, based on calculated achievable rates for the accessing subscriber to achieve a requested data rate and for the one or more subscribers at each of the OFDMA channels.

6. The network defined in claim 1 wherein the traffic channel allocation logic allocates the OFDMA channels, in response to receiving 2-D spatial signatures of an accessing subscriber and one or more subscribers with on-going traffic and data rates of on-going traffic, by:

calculating an achievable rate for the accessing subscriber unit over each of the OFDMA channels, calculating updated achievable rates of subscribers at each of the OFDMA channels with on-going traffic as if the accessing subscriber is added to said each of the OFDMA channels, and selecting OFDMA channels, based on achievable rates, for use by the accessing subscriber to achieve a requested data rate.

7. The network defined in claim 1 wherein the traffic channel allocation logic comprises:

a first input for a two-dimensional (2-D) spatial signature of an accessing subscriber;

a second input for a requested data rate of the accessing subscriber;

a third input for data rates of on-going traffic in each of the plurality of OFDMA channels;

a fourth input for 2-D spatial signatures of on-going subscribers;

achievable rate calculation logic coupled to the first, second, third, and fourth inputs to calculate an achievable rate for the accessing subscriber over each of the OFDMA channels and calculates updated achievable rates of subscribers at each of the OFDMA channels with on-going traffic as if the accessing subscriber is added to said each of the OFDMA channels; and channel selection logic coupled to the achievable rate calculation logic to select OFDMA channels, based on achievable rates, for use by the accessing subscriber to achieve the requested data rate.

8. The network defined in claim 7 wherein the channel selection logic does not allocate OFDMA channels in which calculated updated achievable rates are lower than actual rates of subscribers with on-going traffic.

9. The network defined in claim 1 wherein the traffic channel allocation logic allocates the OFDMA channels, in response to receiving 2-D spatial signatures of an accessing subscriber and one or more subscribers with on-going traffic and data rates of on-going traffic, by selecting OFDMA channels, based on SINRs, for use by the accessing subscriber.

10. The network defined in claim 1 wherein the traffic channel allocation logic allocates the OFDMA channels, in response to 2-D spatial signatures of an accessing subscriber and one or more subscribers with on-going traffic and data rates of on-going traffic, by:

calculating signal-plus-interference to noise ratios (SINRs) for the accessing subscriber over each of the OFDMA channels;

calculating updated SINRs of subscribers at each of the OFDMA channels with on-going traffic as if the accessing subscriber is added to said each of the OFDMA channels; and selecting OFDMA channels, based on SINRs, for use by the accessing subscriber.

11. The network defined in claim 1 wherein the traffic channel allocation logic comprises:

a first input for a two-dimensional (2-D) spatial signature of an accessing subscriber;

a second input for a requested data rate of the accessing subscriber;

a third input for data rates of on-going traffic in each of the plurality of OFDMA channels;

a fourth input for 2-D spatial signatures of on-going subscribers;

calculation logic coupled to the first, second, third, and fourth inputs to calculate signal-plus-interference to noise ratio (SINRs) for the accessing subscriber over each of the OFDMA channels and calculates updated SINRs of subscribers at each of the OFDMA channels with on-going traffic as if the accessing subscriber is added to said each of the OFDMA channels; and channel selection logic coupled to the calculation logic to select OFDMA channels, based on SINRs, for use by the accessing subscriber.

12. The network defined in claim 11 wherein the channel selection logic does not allocate OFDMA channels in which calculated updated SINRs are lower than actual SINRs of subscribers with on-going traffic.

13. The network defined in claim 1 wherein the broadband spatial signature vectors of the subscribers are 2-D spatial signature vectors.

14. A method comprising:

determining frequency and spatial characteristics of a plurality of orthogonal frequency division multiple access (OFDMA) channels for a new subscriber and one or more subscribers with on-going traffic;

allocating a subscriber one or more OFDMA channels based on 2-D spatial signature vectors of the new subscriber and other subscribers with on-going traffic and data rates of on-going traffic.

15. The method defined in claim 14 further comprising: assigning OFDMA/space-division multiple-access (SDMA) traffic channels to multiple access subscribers based on broadband channel characteristics, wherein the broadband channel characteristics comprise space and frequency characteristics.

16. A method comprising:
estimating spatial and frequency characteristics of propagation channels using an FFT-based or parametric channel estimation algorithm between a base station and a new subscriber;
accommodating a rate request of the new subscriber by assigning OFDMA traffic channels that use a first amount of transmission power and cause a second amount of interference to co-channel subscribers.

17. The method defined in claim 16 wherein estimating characteristics of propagation channels is performed using a FFT-based or parametric channel estimation algorithm.

18. The method defined in claim 16 wherein the first amount comprises a minimum amount of transmission power as compared to other OFDMA channels not assigned to the new subscriber.

19. The method defined in claim 16 wherein the second amount comprises the least amount of interference caused to co-channel subscribers in comparison to interference caused to one or more subscribers if using one or more of the OFDMA traffic channels that are not assigned to the new subscriber.

20. The method defined in claim 16 wherein estimating spatial and frequency characteristics comprise estimating a 2-D spatial signature of the new subscriber over a predetermined number of OFDMA channels.

21. The method defined in claim 16 wherein the predetermined number of OFDMA channels comprises all of the OFDMA channels.

22. The method defined in claim 16 further comprising determining an achievable rate of the new subscriber over each of the OFDMA channels with a presence of on-going subscribers.

23. The method defined in claim 22 wherein determining the achievable rate is performed using spatial characteristics of on-going traffic and a 2-D spatial signature of the new subscriber over all of the OFDMA traffic channels.

24. The method defined in claim 16 further comprising assigning, to the new subscriber, OFDMA traffic channels with the highest achievable rates and least effect on other subscribers with on-going traffic over some portion of the OFDMA channels.

25. A method of assigning orthogonal frequency-division multiple-access (OFDMA) traffic channels in conjunction with a space-division multiple access (SDMA) protocol comprising:
estimating broadband spatial and frequency channel characteristics of a requesting subscriber;
determining, for each of the OFDMA traffic channel, an achievable rate of the requesting subscriber over each of the OFDMA traffic channels;
calculating, for each of the OFDMA traffic channel, a new achievable rate of at least one other subscriber with on-going traffic on one or more of the OFDMA traffic channels if the at least one other subscriber is to share the one or more OFDMA traffic channels with the requesting subscriber;
determining candidate traffic channels; and
allocating candidate traffic channels to the requesting subscriber unit to satisfy the requested data rate.

26. The method defined in claim 25 wherein determining the achievable rate of the requesting subscriber comprises using single-user detection or multi-user detection.

27. The method defined in claim 25 wherein performing spatial multiplexing includes performing single-user beamforming and multi-user beamforming.

28. The method defined in claim 25 wherein allocating candidate traffic channels comprises performing channel allocation based on reducing resource usage while satisfying the QoS requirements of the subscriber.

29. The method defined in claim 28 wherein performing channel allocation is based on minimizing the resource usage.

30. The method defined in claim 25 wherein determining the achievable rate of the requesting subscriber over each of the OFDMA traffic channels and calculating the new achievable rate of the at least one other subscriber with on-going traffic occurs based on 2-D spatial signatures of the requesting subscriber and the at least one other subscriber with on-going traffic and data rates of on-going traffic.

31. A base station comprising:
a plurality of receiving antennas;
a plurality of down converters coupled to the plurality of receiving antennas;
a new accessing subscriber spatial signature register;
an on-going traffic spatial signature register; and
an OFDMA traffic channel allocator coupled to the new accessing subscriber spatial signature register and the on-going traffic spatial signature register.

32. The base station defined in claim 31 wherein the channel allocation logic allocates OFDMA channels to a new subscriber based on information from the new subscriber spatial signature register and the on-going traffic spatial signature register.

33. The base station defined in claim 31 further comprising:
an OFDMA medium access control (MAC) logic coupled to the channel allocator;
an OFDM modulator coupled to the OFDMA MAC logic;
a plurality of parallel narrowband beamformers coupled to the OFDM modulation;
a plurality of upconverters coupled to the plurality of beamformers; and
a plurality of transmitting antennas coupled to the plurality of upconverters.

34. The base station defined in claim 1 wherein the new accessing subscriber spatial signature register and the on-going traffic spatial signature register store 2-D spatial signatures.

35. A base station comprising:
a plurality of receiving antennas;
a plurality of down converters coupled to the plurality of receiving antennas;
a new accessing subscriber spatial signature register;
an on-going traffic spatial signature register; and
an OFDMA traffic channel allocator coupled to the new accessing subscriber spatial signature register and the on-going traffic spatial signature register, wherein the channel allocator comprises
a first input for a two-dimensional (2-D) spatial signature of an accessing subscriber;
a second input for a requested data rate of the accessing subscriber;

a third input for data rates of on-going traffic in each of the plurality of OFDMA channels;

a fourth input for 2-D spatial signatures of on-going subscribers;

achievable rate calculation logic coupled to the first, second, third, and fourth inputs to calculate an achievable rate for the accessing subscriber over each of the OFDMA channels and calculates updated achievable rates of subscribers at each of the OFDMA channels with on-going traffic as if the accessing subscriber is added to said each of the OFDMA channels; and channel selection logic coupled to the achievable rate calculation logic to select OFDMA channels, based on achievable rates, for use by the accessing subscriber to achieve the requested data rate.

36. The base station defined in claim 35 wherein the channel selection logic does not allocate OFDMA channels in which calculated updated achievable rates are lower than actual rates of subscribers with on-going traffic.

37. A base station comprising:

a plurality of receiving antennas;

a plurality of down converters coupled to the plurality of receiving antennas;

a new accessing subscriber spatial signature register;

an on-going traffic spatial signature register; and an OFDMA traffic channel allocator coupled to the new accessing subscriber spatial signature resister and the on-going traffic spatial signature register, wherein the channel allocator comprises a first input for a two-dimensional (2-D) spatial signature of an accessing subscriber;

a second input for a requested data rate of the accessing subscriber;

a third input for data rates of on-going traffic in each of the plurality of OFDMA channels;

a fourth input for 2-D spatial signatures of on-going subscribers;

calculation logic coupled to the first, second, third, and fourth inputs to calculate signal-plus-interference to noise ratio (SINRs) for the accessing subscriber over each of the OFDMA channels and calculates updated SINRs of subscribers at each of the OFDMA channels with on-going traffic as if the accessing subscriber is added to said each of the OFDMA channels; and channel selection logic coupled to the calculation logic to select OFDMA channels, based on SINRs, for use by the accessing subscriber.

38. The base station defined in claim 35 wherein the channel selection logic does not allocate OFDMA channels in which calculated updated SINRs are lower than actual SINRs of subscribers with on-going traffic.

39. A method comprising:

determining frequency and spatial characteristics of a plurality of orthogonal frequency division multiple access (OFDMA) channels for a new subscriber and one or more subscribers with on-going traffic;

allocating a subscriber one or more OFDMA channels based on on-going traffic among the OFDMA channels, including selecting OFDMA channels, in response to 2-D spatial signatures of the new subscriber and one or more subscribers with on-going traffic and data rates of on-going traffic, based on calculated achievable rates for the new subscriber to achieve a requested data rate and for the one or more subscribers at each of the OFDMA channels.

40. The method defined in claim 39 further comprising:

calculating an achievable rate for a new subscriber unit over each of the OFDMA channels, calculating updated achievable rates of subscribers at each of the OFDMA channels with on-going traffic as if the new subscriber is added to said each of the OFDMA channels, and wherein the OFDMA channels are selected, based on achievable rates, for use by the new subscriber to achieve a requested data rate.

41. A method comprising:

determining frequency and spatial characteristics of a plurality of orthogonal frequency division multiple access (OFDMA) channels for a new subscriber and one or more subscribers with on-going traffic;

allocating a subscriber one or more OFDMA channels based on on-going traffic among the OFDMA channels, including selecting OFDMA channels, in response to 2-D spatial signatures of the new subscriber and one or more subscribers with on-going traffic and data rates of on-going traffic, based on SINRs, for use by the new subscriber.

42. The method defined in claim 41 further comprising:

calculating signal-plus-interference to noise ratios (SINRs) for the new subscriber over each of the OFDMA channels;

calculating updated SINRs of subscribers at each of the OFDMA channels with on-going traffic as if the new subscriber is added to said each of the OFDMA channels; and wherein the OFDMA channels are selected, based on SINRs, for use by the accessing subscriber.

* * * * *

UNITED STATES PATENT AND TRADEMARK OFFICE
CERTIFICATE OF CORRECTION

| | | |
|---|---|---|
| PATENT NO. | : 6,870,808 B1 | Page 1 of 1 |
| APPLICATION NO. | : 09/692681 | |
| DATED | : March 22, 2005 | |
| INVENTOR(S) | : Hui Liu et al. | |

It is certified that error appears in the above-identified patent and that said Letters Patent is hereby corrected as shown below:

Column 11:
Line 35, claim 21 change "claim 16" to --claim 20--.

Column 12:
Line 48, claim 33 change "claim 1" to --claim 31--.

Column 13:
Line 50, claim 38 change "claim 35" to --claim 37--.

Signed and Sealed this
Nineteenth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 6,870,808 B1  
APPLICATION NO. : 09/692681  
DATED : March 22, 2005  
INVENTOR(S) : Hui Liu et al.

It is certified that error appears in the above-identified patent and that said Letters Patent is hereby corrected as shown below:

In the Claims:

Column 11:  
Line 35, claim 21 change "claim 16" to --claim 20--.

Column 12:  
Line 48, claim 34 change "claim 1" to --claim 31--.

Column 13:  
Line 50, claim 38 change "claim 35" to --claim 37--.

This certificate supersedes the Certificate of Correction issued March 19, 2013.

Signed and Sealed this  
Twenty-first Day of May, 2013

Teresa Stanek Rea  
*Acting Director of the United States Patent and Trademark Office*